(12) United States Patent
Mayle et al.

(10) Patent No.: US 10,989,578 B2
(45) Date of Patent: Apr. 27, 2021

(54) ULTRASONIC METER AND METHOD FOR SENSING A FLOW VARIABLE

(71) Applicant: DIEHL METERING GMBH, Ansbach (DE)

(72) Inventors: Michael Mayle, Ansbach (DE); Peter Ploss, Bayreuth (DE)

(73) Assignee: Diehl Metering GmbH, Ansbach (DE)

( * ) Notice: Subject to any disclaimer, the term of this patent is extended or adjusted under 35 U.S.C. 154(b) by 0 days.

(21) Appl. No.: 16/531,319

(22) Filed: Aug. 5, 2019

(65) Prior Publication Data

US 2020/0003593 A1 Jan. 2, 2020

Related U.S. Application Data

(63) Continuation of application No. PCT/EP2018/000007, filed on Jan. 4, 2018.

(30) Foreign Application Priority Data

Feb. 3, 2017 (DE) .......................... 102017000959.7
Apr. 26, 2017 (DE) .......................... 102017004038.9

(51) Int. Cl.
*G01F 1/66* (2006.01)
(52) U.S. Cl.
CPC .............. *G01F 1/662* (2013.01); *G01F 1/667* (2013.01)
(58) Field of Classification Search
None
See application file for complete search history.

(56) References Cited

U.S. PATENT DOCUMENTS 4,735,097 A 4/1988 Lynnworth
5,650,572 A * 7/1997 Vontz ...................... G01F 1/662
73/861.27

(Continued)

FOREIGN PATENT DOCUMENTS

DE 19823165 A1 12/1998
DE 102006019146 B3 9/2007

(Continued)

OTHER PUBLICATIONS

Lindner, Gerhard.,: "Topical Review; Sensors and actuators based on surface acoustic waves propagating along solid-liquid interfaces". Journal of physics d: Applied physics Institute of physics publishing Ltd, Jun. 21, 2008.

(Continued)

*Primary Examiner* — Harshad R Patel
(74) *Attorney, Agent, or Firm* — Laurence A. Greenberg; Werner H. Sterner; Ralph E. Locher

(57) ABSTRACT

An ultrasonic meter for recording a flow quantity dependent on a flow of a fluid, has a control device, a measuring tube having a plurality of side walls, mutually adjacent side walls being at an angle to one another, and through which the fluid can flow in a longitudinal direction of the measuring tube, and first and second ultrasound transducers which are arranged at a distance from one another in the longitudinal direction on the measuring tube. The first and second ultrasound transducers respectively contain one transducer element or a predetermined arrangement of a plurality of transducer elements. The ultrasound transducer can be driven by the control device in order to excite an acoustic wave conducted in a side wall of the measuring tube, and conducted through the fluid to the other ultrasound transducer and recorded there by the control device to determine a signal time of flight.

13 Claims, 4 Drawing Sheets

(56) References Cited

U.S. PATENT DOCUMENTS

| | | | | |
|---|---|---|---|---|
| 6,026,693 A | * | 2/2000 | Baumoel | G01F 1/662 |
| | | | | 73/861.27 |
| 6,044,714 A | | 4/2000 | Lowell et al. | |
| 6,098,466 A | | 8/2000 | Shkarlet | |
| 8,443,842 B2 | | 5/2013 | Sonnenberg | |
| 2010/0095782 A1 | * | 4/2010 | Ferencz | G01F 1/667 |
| | | | | 73/861.28 |
| 2011/0271769 A1 | | 11/2011 | Kippersund et al. | |
| 2016/0320219 A1 | * | 11/2016 | Hellevang | G01F 1/662 |

FOREIGN PATENT DOCUMENTS

| | | | | |
|---|---|---|---|---|
| DE | 102009048646 A1 | 3/2011 | | |
| DE | 102008049891 B4 | 12/2012 | | |
| EP | 1173733 B1 | 5/2011 | | |
| WO | 2014021846 A1 | 2/2014 | | |
| WO | WO-2015096902 A1 | * | 7/2015 | G01N 29/22 |

OTHER PUBLICATIONS

L.C. Lynnworth, et al.: "Ultrasonic flowmeters": Half-century progress report, 1955-2005, 2006 Elsevier B.V.

* cited by examiner

ULTRASONIC METER AND METHOD FOR SENSING A FLOW VARIABLE

CROSS-REFERENCE TO RELATED APPLICATION

This is a continuation application, under 35 U.S.C. § 120, of copending international application No. PCT/EP2018/000007, filed Jan. 4, 2018, which designated the United States; this application also claims the priority, under 35 U.S.C. § 119, of German patent application No. DE 10 2017 000 959.7, filed Feb. 3, 2017 and German patent application No. DE 10 2017 004 038.9, filed Apr. 26, 2017; the prior applications are herewith incorporated by reference in their entirety.

BACKGROUND OF THE INVENTION

Field of the Invention

The invention relates to an ultrasonic meter for recording a flow quantity dependent on a flow of a fluid.

One possibility for measuring a flow through a measuring tube involves ultrasonic meters. In these, at least one ultrasound transducer is used in order to introduce an ultrasound wave into the fluid flowing through the measuring tube, this wave being conducted on a straight path or after multiple reflections at walls or special reflector elements to a second ultrasound transducer. A flow velocity through the measuring tube can be determined from the time of flight of the ultrasound wave between the ultrasound transducers, or from a time-of-flight difference in the event of interchanging of the emitter and receiver.

Because of the measurement principle described, the measured times of flight are dependent on the flow velocity of the fluid in the region of the propagation path of the ultrasound wave. It is therefore not an actual average flow velocity that is measured, but an average flow velocity in the region of the propagation path of the ultrasound wave. This is problematic since the flow velocity in a measuring tube is position-dependent. This will be explained below with reference to the example of a cylindrical measuring tube, but it applies to all tube cross sections.

For a laminar flow, i.e. in particular at low flow velocities, the velocity profile of a cylindrical measuring tube may be described as follows as a function of the radial coordinate $v(r)$:

$$v(r) = v_{max}\left(1 - \frac{r^2}{r_0^2}\right).$$

Here, $v_{max}$ is the maximum axial velocity in the flow profile, r is the distance from a midline of the measuring tube, and $r_0$ is the internal radius of the measuring tube. The flow velocity therefore decreases toward the edge of the measuring tube.

For turbulent flows, i.e. particularly at high flow velocities, the velocity profile may be described approximately as follows:

$$v(r) \approx v_{max}\left(1 - \frac{r^2}{r_0^2}\right)^{\gamma}.$$

The additional exponent $\gamma$ may be assumed approximately to be $1/7$ if the Reynolds number for the flow lies between $10^4$ and $10^5$.

For a known path of the ultrasound beam through the measuring tube, the profile shape may be taken into account approximately by taking into account a correction factor for the calculation of the average flow, or the average flow velocity. This may depend on the measured time of flight or velocity. A corresponding calculation is, however, affected by error when the flow can change between laminar and turbulent flow, since in this case hysteresis may occur which cannot be described by such a correction factor.

In the prior art, several approaches for reducing corresponding measurement errors are known. For example, the article L. C. Lynnworth, et al. "Ultrasonic Flowmeters: Half-Century Progress Report, 1955-2005", Ultrasonics Vol. 44, Supplement 1, December 2006, e1371 discloses ultrasonic meters which contain a plurality of emitters and receivers and therefore a plurality of propagation paths for the ultrasound waves. However, this approach increases the complexity of the ultrasonic meter and therefore also the resulting production costs.

German patent DE 10 2008 049 891 B4, corresponding to U.S. Pat. No. 8,443,842, on the other hand, proposes to carry out preconditioning of the flow before the flow measurement. Corresponding preconditioning may, however, increase the flow resistance of the flow meter and furthermore likewise increases the complexity of the measuring arrangement.

In order to achieve a simple measurement structure, U.S. Pat. No. 4,735,097 A proposes to use ultrasound transducers which are fastened externally on the measuring tube. These are used in order to induce conducted waves on the measuring tube, so that a lower accuracy is required when arranging the ultrasound transducers on the measuring tube.

SUMMARY OF THE INVENTION

The object of the invention is to provide an ultrasonic meter which makes an improved measurement accuracy possible and, in particular, is substantially insensitive to a flow change between laminar and turbulent flow.

The object is according to the invention by an ultrasonic meter for recording a flow quantity dependent on a flow of a fluid, having a control device, a measuring tube which is formed by a plurality of side walls, mutually adjacent side walls being at an angle to one another, and through which the fluid can flow in a longitudinal direction of the measuring tube, and a first and a second ultrasound transducer which are arranged at a distance from one another in the longitudinal direction on the measuring tube. The first and the second ultrasound transducer respectively contain one transducer element or a predetermined arrangement of a plurality of transducer elements. The first and/or the second ultrasound transducer is or are drivable by the control device in order to excite an acoustic wave conducted in a side wall of the measuring tube, which can be conducted through the fluid to the respective other ultrasound transducer and can be recorded there by the control device in order to determine a signal time of flight. An excitation width of the first and/or of the second ultrasound transducer, over which the transducer element or the arrangement of the transducer elements extends, is at least 50% of the width of an inner surface of that side wall on which the respective ultrasound transducer is arranged, and/or wherein a propagation direction of the conducted wave which can be excited by the first and/or second ultrasound transducer is at an angle to the longitudinal direction of the measuring tube, and/or wherein the conducted wave can be emitted over a predetermined angle range by the first and/or the second ultrasound transducer.

According to the invention, it is proposed to combine excitation of conducted waves in the measuring tube, which, as will be explained in more detail below, can lead to emission, extended in a propagation direction of the conducted waves, of a compression wave into the fluid, with a large excitation width, or with excitation of a conducted wave having an oblique propagation direction, or emission over an angle range. The combination of these approaches leads to the greatest possible part of the flow profile being "sampled" in the scope of the ultrasound measurement, so that different parts of the flow profile are automatically already taken into account in the scope of the measurement process and averaging over their flow velocity takes place.

In order to sample the flow profile in the direction perpendicular to the longitudinal direction of the measuring tube, it is on the one hand proposed to use an ultrasound transducer which excites the conducted waves used for the measurement over a large part of the width of the internal surface of the side wall. A relatively large part of the width of the side wall and, for example in the case of a rectangular measuring tube, of the entire flow profile, is therefore taken into account. The width of the internal surface is in this case intended to mean the extent of the internal surface perpendicularly to the longitudinal direction of the measuring tube, particularly in the region of the respective ultrasound transducer. In addition or as an alternative, the conducted wave may be excited at an angle to the longitudinal direction of the measuring tube. Since the side walls are at an angle, in particular perpendicular, to one another, a conducted wave which propagates along one of the side walls is at least partially reflected at the lateral edge of this side wall, at which the latter meets a further side wall at an angle. The effect of this is that the conducted wave travels in a zigzag shape along that side wall on which the exciting ultrasound transducer is arranged. The effect of this is that the course of the flow profile over the entire width of the side wall perpendicularly to the longitudinal direction of the measuring tube can influence the time of flight between the ultrasound transducers and can therefore be taken into account.

What is essential in this case is that the excitation of conducted waves of the side wall leads to compression waves being emitted into the fluid. As conducted waves, in particular Lamb waves and/or Rayleigh waves may be excited. Excitation of Lamb waves takes place when the wall thickness is comparable to the wavelength of the transverse wave of the solid. Such conducted waves are combined pressure and shear waves, and therefore also lead to deflections of the internal surface of the side wall in the direction of the fluid, or away from the fluid. By these deflections, compression waves are in turn initiated in the fluid. The entire region inside which the conducted wave propagates on the side wall may therefore be used as an excitation surface for a compression oscillation of the fluid.

Together with the above-explained large excitation width, or angled emission, ultrasound emission can therefore be achieved essentially over the entire width of the measuring tube, so that the entire flow profile can be taken into account in the scope of determining the flow quantity. Similar considerations apply for the reception of the pressure wave at the other ultrasound transducer. A pressure wave incident on the side wall in turn contributes to the excitation of a conducted wave on the side wall, so that the reception surface of the respective receiving ultrasound transducer may also be increased by the use of induced conducted waves.

The transition between a conducted wave of a wall and an adjacent fluid is presented, for example, in the article G. Lindner, "Sensors and Actuators Based on Surface Acoustic Waves Propagating Along Solid-Liquid Interfaces", Journal of Physics D, Vol. 41, No. 12, 2008, p. 123002, and will be described only in outline below. If a conducted wave is propagating along a wall delimiting a fluid volume, a compression wave will be emitted into the fluid at the so-called Rayleigh angle, the sine of which depends on the ratio of the speed of sound in the fluid to the phase velocity of the wave conducted in the wall. If times of flight between the first and the second ultrasound transducer are then measured and the time-of-flight difference between the two transport directions is calculated, the following relationship is obtained for the time-of-flight difference for an individual ultrasound beam which has been initiated by the conducted wave:

$$\Delta t = \int \left( \frac{1}{c_f - v_p(l)} - \frac{1}{c_f + v_p(l)} \right) dl \approx \frac{2L\overline{v_p}}{c_f^2}.$$

Here, $c_f$ is the speed of sound in the fluid, $v_p(l)$ is the velocity of the fluid parallel to the beam direction at the position l along the ultrasound beam, L is the total length of the path of the ultrasound beam in the fluid, and $\overline{v_p}$ is the flow velocity of the fluid parallel to the beam propagation direction, averaged along the path. The approximate solution assumes that the speed of sound in the medium is substantially greater than the flow velocity parallel to the beam propagation direction. By rearranging this equation, $\overline{v_p}$ can therefore be calculated from the time-of-flight difference which has been determined, and therefore so can the flow velocity in the longitudinal direction of the measuring tube, averaged over the beam path. If it were assumed that this is equal to the actual average flow velocity, a flow volume could be calculated by multiplication of this quantity by the internal surface area of the measuring tube. Yet since, as explained in the introduction, this is not the case when using individual measurement beams, an additional calibration factor is typically used, which may be dependent on the average velocity along the measurement beam and the path length.

In the method according to the invention, the above-explained integration over a measurement path becomes integration over a measurement volume, i.e. integration over the excitation surface and the measurement beams emitted by the latter is additionally carried out. Excitation takes place over the entire excitation width and over the propagation path of the conducted wave. Substantially larger parts of the flow cross section are therefore taken into account during the determination of the time-of-flight difference, so that the calculated average velocity $\overline{v_p}$ is the average velocity in a volume which takes into account a large part of the flow cross section. The effects of the flow profile can therefore be taken into account much better.

The transition region between adjacent side walls of the measuring tube which are at an angle to one another may be configured (internally and externally) in the form of a pronounced edge. It may, however, also be configured to be—to a greater or lesser extent—rounded (internally and/or externally). The side walls themselves may be configured to be planar or (in particular outwardly) curved, the radius of curvature of the curvature being much greater than that of the transition region so that the cross section of the measuring tube differs significantly from a round or elliptical shape.

The internal surfaces of the side walls, of which the measuring tube is composed, may be rectangular or have a trapezoid shape. The trapezoid shape may, in particular, have only a small aperture angle compared with the rectangular shape of from 1 to 2 degrees, in order to slightly increase or reduce the flow cross section of the measuring tube in the flow direction and therefore stabilize the flow. The side walls may be planar at least on their internal surface.

The measuring tube may comprise two, in particular parallel, opposite side walls (optionally with rounded corners and/or sides curved outward). The first and second ultrasound transducers may be arranged together on one of these side walls or on different ones of these side walls. The cross-sectional area spanned by the opposite side walls may be at least 75% of the cross-sectional area of the measuring tube through which flow takes place.

The measuring tube may have a rectangular tube cross section. In particular, the cross section of the measuring tube may be constant over the entire tube length, or at least in the region between the first and the second ultrasound transducers. As explained above, slight widening or narrowing of the tube cross section may also be carried out in order to stabilize the flow.

It is possible that the transducer element or the transducer elements is or are deformable in order to excite the conducted wave, the transducer element or the transducer elements respectively having a round or elliptical contact surface for coupling with the side wall. As an alternative or in addition, the transducer elements of the first and/or of the second ultrasound transducer may be arranged linearly, in a parabolically concave arc or in a v-shape.

The transducer element may be deformable in order to excite the conducted wave and have a rectangular contact surface for coupling with the side wall, two sides of the contact surface being perpendicular to the propagation direction, the side lengths of the sides corresponding to the excitation width. The transducer element may be coupled directly with the side wall, for example being adhesively bonded thereon, or connected indirectly to the side wall by means of a coupling element. The excitation element may, for example, be a piezo actuator which can change its extent by corresponding driving by the control device. For example, an interdigital transducer may be used, which comprises control lines engaging in one another in the manner of a comb, in order to achieve excitation with a particular excitation mode.

The propagation direction of the conducted wave that can be excited by the first and/or second ultrasound transducer may be at an angle of between 10° and 80°, in particular between 40° and 50°, with respect to the longitudinal direction of the measuring tube. By a sufficiently large selection of the angle between the propagation direction and the longitudinal direction, it is possible to achieve the effect that, even in the event of relatively strong attenuation of the conducted wave in the propagation direction, at least large parts of the internal surface of the side wall are passed over by the conducted wave, so that excitation of pressure waves in the fluid can be carried out over the entire width of the side wall. Angles in the region of about 45° between the propagation direction and the longitudinal direction of the measuring tube are advantageous particularly when, as will be explained in more detail below, conducted waves are emitted in different propagation directions in order to further improve the coverage of the flow cross section.

The predetermined angle range may be 360°. In particular, the conducted wave may be coupled uniformly into the side wall in all directions.

The excitation width of the first and/or of the second ultrasound transducer may be at least 70% or 80% of the width of the internal surface of that side wall on which the respective ultrasound transducer is arranged. In particular, the excitation width may be equal to the width of the internal surface or at least 90% thereof. In this way, even in the case of an emission direction of the conducted wave extending parallel to the longitudinal direction of the measuring tube, the effect is achieved that even the edge regions of the flow profile can be taken into account during the determination of the signal time of flight, and therefore of the flow quantity.

The first and/or the second ultrasound transducer may be drivable by the control device in such a way that two conducted waves of the measuring tube with mutually perpendicular propagation directions can be excited simultaneously or with a time offset by the respective ultrasound transducer. Two different propagation paths for the conducted wave are thus produced, and that region in which pressure waves are emitted into the fluid to be measured is increased. If the respective ultrasound transducer is or comprises a transducer element, this may therefore, in particular mutually independently, be excitable in two mutually perpendicular directions. Preferably, the wavelengths of the conducted waves emitted in both directions are the same.

The excitation widths may be the same for the two conducted waves which can be excited by the ultrasound transducer. In particular, a square transducer element may therefore be used as part of the ultrasound transducer or as the ultrasound transducer. Preferably, the same oscillation mode is furthermore excited in both propagation directions, that is to say the conducted waves which are excited have the same wavelength.

The control device and the first and/or the second ultrasound transducer may be adapted to excite a Lamb wave. This is advantageous in particular when the ultrasound transducer is intended to be arranged outside the internal space, through which fluid flows, of the measuring tube. If the thickness of the side wall is comparable to the wavelength of the transverse wave of the isotropic solid, it is possible to excite Lamb waves which entail a deformation of both surfaces of the side wall. With an increasing thickness of the side wall, a continuous transition to the excitation of Rayleigh waves (surface waves) takes place. An amplitude of the surface waves decreases exponentially with increasing depth in thick materials.

The first and/or the second ultrasound transducer may be arranged on the outer side of the measuring tube. In particular, the internal space of the measuring tube, i.e. the volume through which fluid flows, may be entirely free over the entire length of the measuring tube or at least in a measurement section between the first and the second ultrasound transducer, apart from the side walls that delimit the measuring tube. In this way, very low flow resistances can be achieved. Furthermore, relatively simple configured ultrasound transducers may be used, since the latter do not need to be sealed against the fluid.

The fluid may be a liquid, for example water, a gas or a gas mixture, for example natural gas.

The first and/or the second ultrasound transducer may be drivable by the control device in such a way that a conducted wave with precisely one mode and/or two conducted waves each with precisely one mode and with mutually perpendicular propagation directions can be excited. Such mode-selective excitation is advantageous since the angle at which a pressure wave initiated by the conducted wave is emitted into the fluid, in relation to the propagation direction of the conducted wave, as explained in the introduction, depends on the phase velocity of the conducted wave and therefore typically on its excitation mode. At the receiving ultrasound transducer, in the case of using a plurality of modes, a superposition of reception signals which have passed through the fluid with different angles with respect to the flow direction would therefore be received. It is in principle possible to reconstruct the times of flight for the individual modes from such a reception signal, and under certain circumstances even obtain additional information about the fluid. This, however, significantly increases the complexity of the signal evaluation and may therefore lead to a measurement which is not very robust. Preferably, therefore, only a single mode is used for the measurement. As explained, mode-selective excitation is possible for example using interdigital transducers.

Besides the ultrasonic meter according to the invention, the invention relates to a method for recording a flow quantity dependent on a flow of a fluid. In the method an ultrasonic meter has a control device, a measuring tube which is formed by a plurality of side walls, mutually adjacent side walls being at an angle to one another, and through which the fluid flows in a longitudinal direction of the measuring tube, and a first and a second ultrasound transducer which are arranged at a distance from one another in the longitudinal direction on the measuring tube. The first and/or the second ultrasound transducer respectively contain(s) one transducer element or a predetermined arrangement of a plurality of transducer elements, is used. The first and/or the second ultrasound transducer are driven by the control device in order to excite an acoustic wave conducted in a side wall of the measuring tube, which is conducted through the fluid to the respective other ultrasound transducer and is recorded there by the control device in order to determine a signal time of flight. The flow quantity is determined as a function of the signal time of flight. An excitation width, over which the transducer element or the arrangement of the transducer elements extends, is excited at least 50% of the width of an inner surface of that side wall on which the respective ultrasound transducer is arranged, and/or the conducted wave is with a propagation direction which is at an angle to the longitudinal direction of the measuring tube, and/or the conducted wave is emitted over a predetermined angle range by the first and/or the second ultrasound transducer.

With the method according to the invention, the advantages explained in relation to the ultrasonic meter according to the invention can be achieved. It may furthermore be refined with features which have been explained in relation to the ultrasonic meter according to the invention.

Other features which are considered as characteristic for the invention are set forth in the appended claims.

Although the invention is illustrated and described herein as embodied in a ultrasonic meter and a method for sensing a flow variable, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
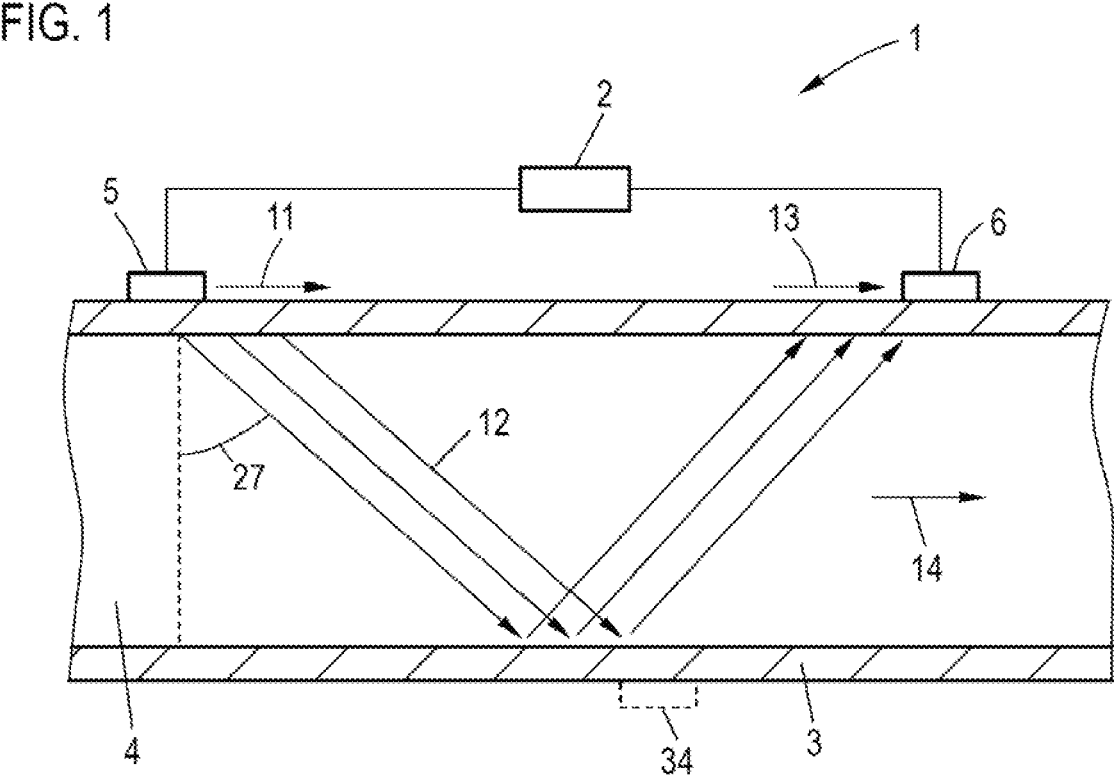
FIG. 1 is a diagrammatic, longitudinal sectional view of an exemplary embodiment of an ultrasonic meter according to the invention, using which an exemplary embodiment of the method according to the invention may be carried out.

Referring now to the figures of the drawings in detail and first, particularly to FIG. 1 thereof, there is shown an ultrasonic meter 1 for recording a flow quantity dependent on a flow of a fluid. The ultrasonic meter 1 contains a control device 2, a measuring tube 3 and a first and a second ultrasound transducer 5, 6. The fluid is guided in an internal space 4 of the measuring tube 3 in a longitudinal direction 14 of the measuring tube 3.

In order to determine a flow quantity, in particular a flow volume, a time-of-flight difference of the signal time of flight from the first ultrasound transducer 5 to the second ultrasound transducer 6 and vice versa may be determined by the control device 2. Here, use is made of the fact that this time of flight depends on a velocity component of the fluid parallel to a propagation direction of an ultrasound beam 12 through the fluid. From this time of flight, it is therefore possible to determine an averaged fluid velocity in the direction of the respective ultrasound beam 12 over the path of the respective ultrasound beam 12, and therefore approximately an averaged flow velocity in the volume through which the ultrasound beam 12 passes. A problem with conventional ultrasonic meters, which use a single ultrasound beam for this measurement, is that the latter only passes through a very small part of the flow cross section of the measuring tube 3, so that no information is available regarding regions outside the ultrasound beam 12.

In order to counteract this, an ultrasound beam 12, i.e. a pressure wave, is not induced directly in the fluid by the first ultrasound transducer 5. Instead, a conducted wave (represented schematically by its propagation direction 11), of the measuring tube 3, or in particular of the side wall 7, shown in FIG. 2, of the measuring tube 3 is excited by the ultrasound transducer 5. To this end, an ultrasound transducer 5 is used which contains a transducer element that is deformable perpendicularly to the side wall 7 and/or in the longitudinal direction 14 of the measuring tube 3. The transducer element is coupled with the side surface 7 via a rectangular contact surface, the dimension of which correspond to the plan view, shown in FIG. 3, of the ultrasound transducer 5, in such a way that a deformation of the transducer element also leads to a deformation of the side wall in the region of the contact surface. The excitation is carried out with a frequency which is selected in such a way that a Lamb wave is excited in the side wall 7. Such waves can be excited when the thickness 15 of the side wall 7 is comparable to the wavelength of the transverse wave of the solid, which is given by the ratio of the speed of sound of the transverse wave of the solid and the excited frequency.

A Lamb wave is a combined shear and pressure wave. A local deformation of the internal surface 8 of the side wall 7 therefore results from the conducted wave traveling along the side wall 7. This in turn results in the emission of a pressure wave into the fluid in the entire region inside which the conducted wave propagates. This is schematically represented in FIG. 1 by the ultrasound beams 12 spaced apart in the longitudinal direction 14. The emission of the corresponding pressure waves takes place at the Rayleigh angle 27, which depends on the speed of sound in the fluid and the phase velocity of the conducted wave. For a particular excitation mode, in the case of a known fluid being examined, a known emission angle therefore results. As is conventional with other ultrasonic meters, in this case as well a signal time of flight may therefore be determined for the signal and, for example, a flow may be calculated therefrom. In contrast to conventional flow meters, however, in this case averaging is also carried out over the propagation section of the conducted wave along the propagation direction 11.

On the reception side, the principal of conducted waves is also used. As indicated by the arrow 13, by the incident pressure waves from the fluid in the region of the second ultrasound transducer 6, a conducted wave traveling in the direction of the second ultrasound transducer 6 is induced, which can be recorded by the control device by means of the second ultrasound transducer 6. The procedure described therefore leads to the flow velocities being taken into account in a larger part of the measurement region in the measuring tube 3 between the first and the second ultrasound transducers 5, 6.

Figure 2:
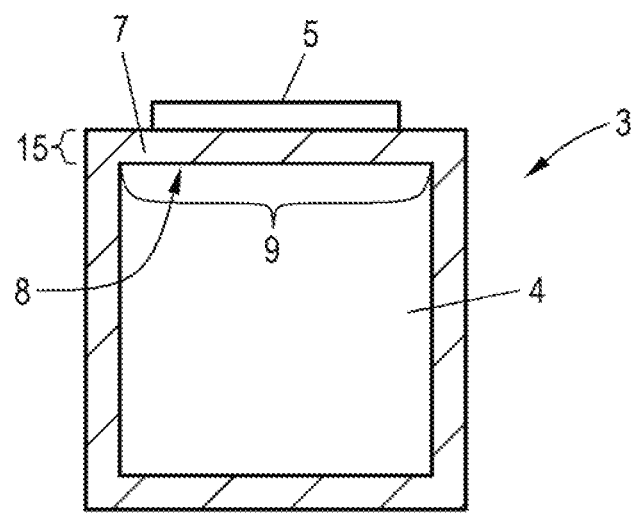
FIG. 2 is an end view of the ultrasonic meter shown in FIG. 1.

As is represented in FIG. 2, a rectangular tube cross section of the measuring tube 3 is used (in which case the corners may be configured—internally and/or externally— to be rounded to a greater or lesser extent). In order also to take into account maximally large parts of the flow cross section perpendicularly to the propagation direction 11 of the conducted wave, an ultrasound transducer 5 is used whose excitation width extends over a large part of the width 9 of the internal surface 8 of that side wall 7 on which it is arranged. Large parts of the flow profile are therefore also jointly taken into account in the transverse direction of the measuring tube 3 in the scope of determining the signal time of flight and therefore, for example, the flow velocity or the volume flow.

Figure 3:
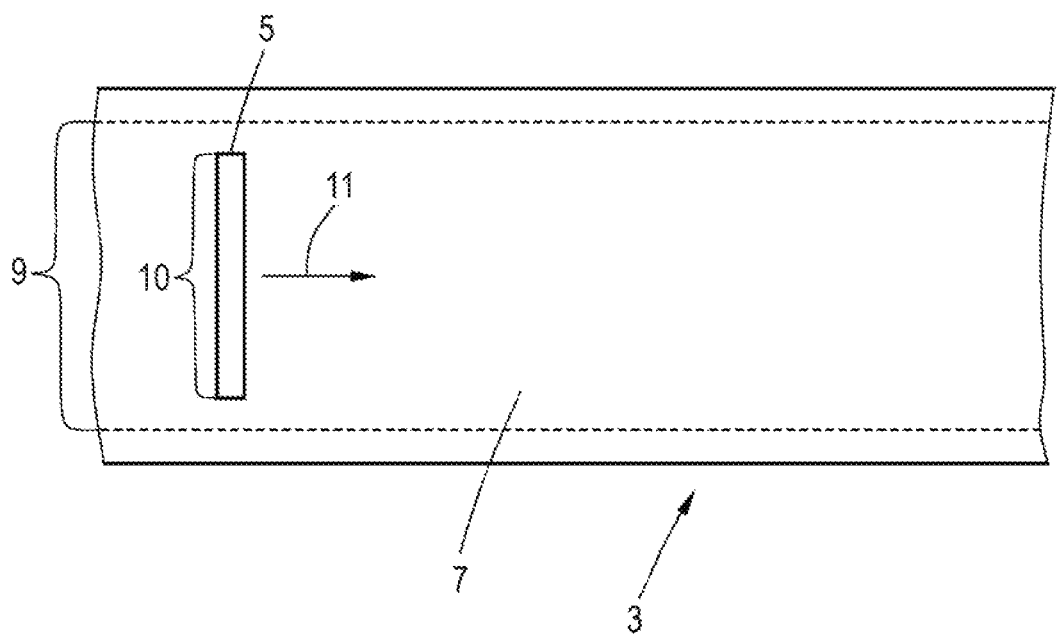
FIG. 3 is a top view of the ultrasonic meter shown in FIG. 1.

FIG. 3 shows an external plan view of the side wall 7 of the measuring tube 3 in the region of the ultrasound transducer 5. The width 9 of the internal surface 8 of the side wall 7 is illustrated by the dashed lines. As can be seen clearly in FIG. 3, selection of a sufficient excitation width 10 of the ultrasound transducer 5 makes it possible to take into account almost the entire flow profile of the fluid in the scope of taking into account the signal time of flight and therefore the flow quantity. Furthermore, it may readily be seen that even larger excitation widths may be selected for the ultrasound transducer 5. For example, the excitation width 10 may extend over the entire width 9 of the internal surface 8, or even beyond this.

Figure 4:
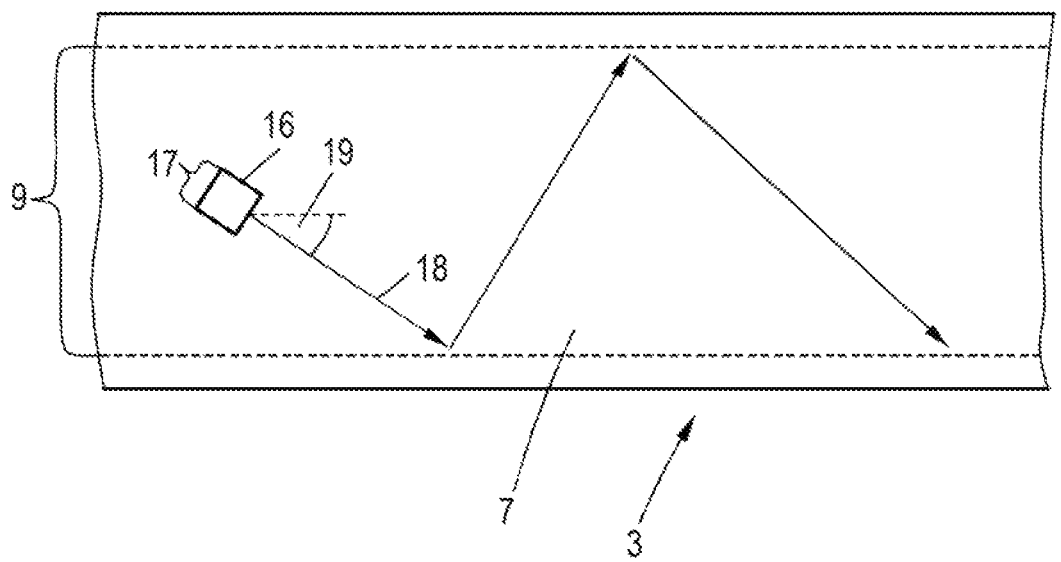
FIGS. 4 to 8 are top view of further exemplary embodiments of the ultrasonic meter according to the invention.
Figure 5:
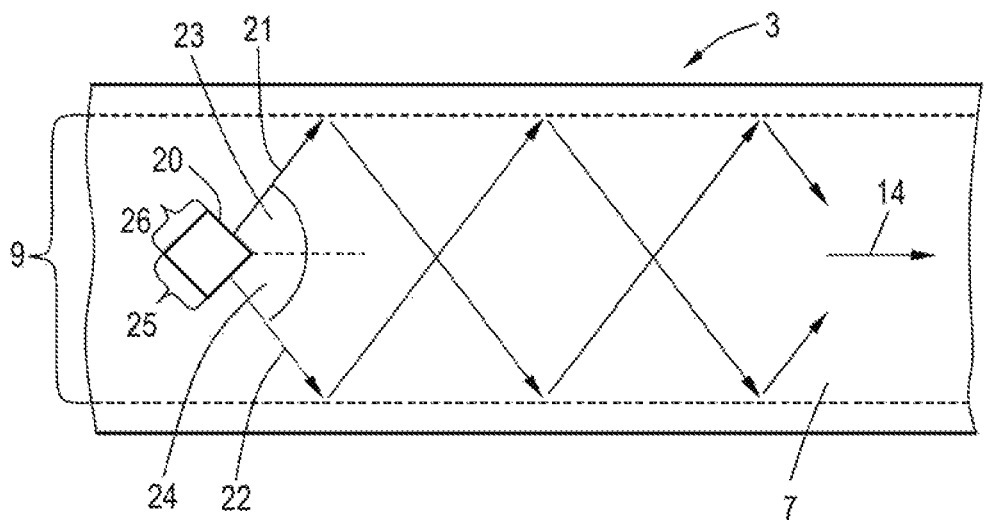

In particular when a measuring tube 3 with a large tube cross section is intended to be used, the use of an ultrasound transducer with a sufficiently large width may be technically relatively elaborate. In the following exemplary embodiments, which are represented in FIGS. 4 and 5, however, even in these cases it is possible to achieve the effect that essentially the entire width of the cross section is taken into account during the determination of the signal time of flight and therefore of the flow quantity. In the exemplary embodiment shown in FIG. 4, the excitation width 17 of the ultrasound transducer 16 is significantly smaller than the width of the internal surface 8 of the side wall 7 of the measuring tube 3. In order nevertheless to record the flow profile over its entire width 9, the ultrasound transducer 16 is arranged on the side surface 7, or is driven by the control device (not shown), in such a way that a conducted wave is emitted with a propagation direction 18 that makes the emission angle 19 with the longitudinal direction 14. The conducted wave, or the pressure waves initiated by it in the fluid, therefore has/have a propagation direction which is at an angle to the longitudinal direction 14. The conducted wave, or the pressure waves, therefore propagate(s) as far as the lateral side walls of the measuring tube 3, are reflected on these and change their propagation direction. The width 9 is therefore covered by the pressure waves reflecting between the lateral side walls, or the conducted wave reflected between the latter.

In order to improve the measurement accuracy of the ultrasonic meter, an additional time-of-flight measurement may optionally be carried out with the aid of a further ultrasound transducer 34. This may, as is represented in FIG. 1, for example be arranged on a side wall lying opposite the ultrasound transducer 5.

The coverage of the width 9, or of the entire internal space of the measuring tube 3, may be further improved if, as shown in FIG. 5, an ultrasound transducer 20 is used which is driven by the control device in such a way that two conducted waves with mutually perpendicular propagation directions 21, 22 are emitted simultaneously or with a time offset. These conducted waves may preferably be emitted with a respective emission angle 23, 24 of about 45° with respect to a longitudinal direction 14 of the measuring tube 3. In this way, symmetrical propagation is achieved. The wavelengths of the emitted conducted waves and the excitation widths 25, 26 are equal.

In a further exemplary embodiment (not shown), it would also be possible to use a rectangular ultrasound transducer 20 whose excitation widths 25, 26 are different to one another. In this case, conducted waves with mutually different wavelengths are emitted in the two propagation directions 21, 22.

Figure 6:
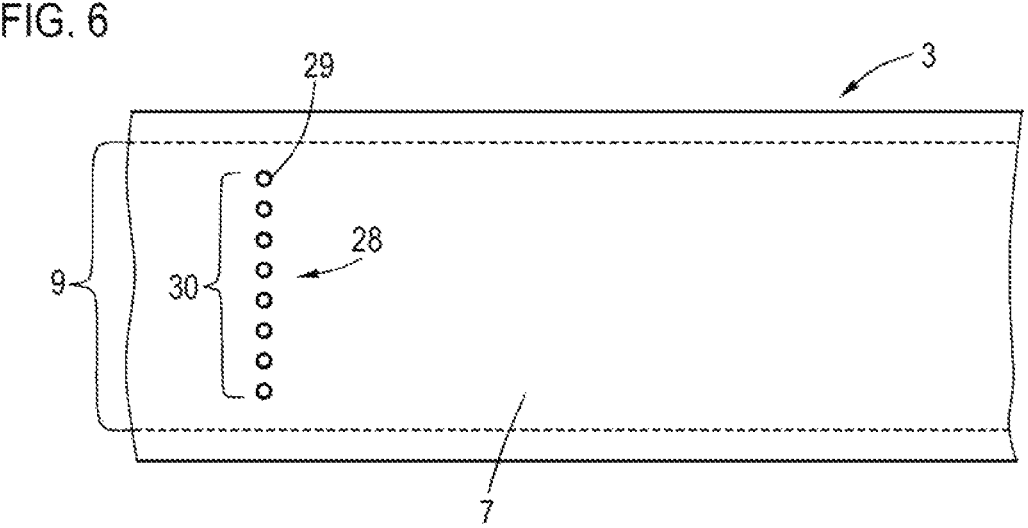

FIG. 6 shows a detail view of a further exemplary embodiment of an ultrasonic meter. The representation corresponds substantially to the representation shown in FIG. 3, although instead of the ultrasound transducer 5 shown in FIG. 3 with a single wide rectangular excitation element, an ultrasound transducer 28 is used which has a multiplicity of individual, in particular round or cylindrical, or even rectangular or cuboid, square or cubic or elliptical transducer elements 29. The transducer elements 29 are arranged linearly and the arrangement of the transducer elements 29 extends over an excitation width 30 which is only slightly narrower than the width 9 of the side wall 7.

In the simplest case, the individual transducer elements 29 may be driven with the same control signal, which results in a conducted wave in the side wall 7 which essentially travels in the longitudinal direction of the measuring tube 3. It is, however, also possible to invite the conducted wave at an angle into the side wall 7, for example by specifying a defined phase offset for the individual transducer elements 29. In an alternative exemplary embodiment (not shown), it would also be possible to arrange the linear arrangement of the transducer elements 29 at an angle to the transverse direction of the measuring tube 3, in order to achieve angled emission with respect to the longitudinal direction 14 of the measuring tube 3.

Figure 7:
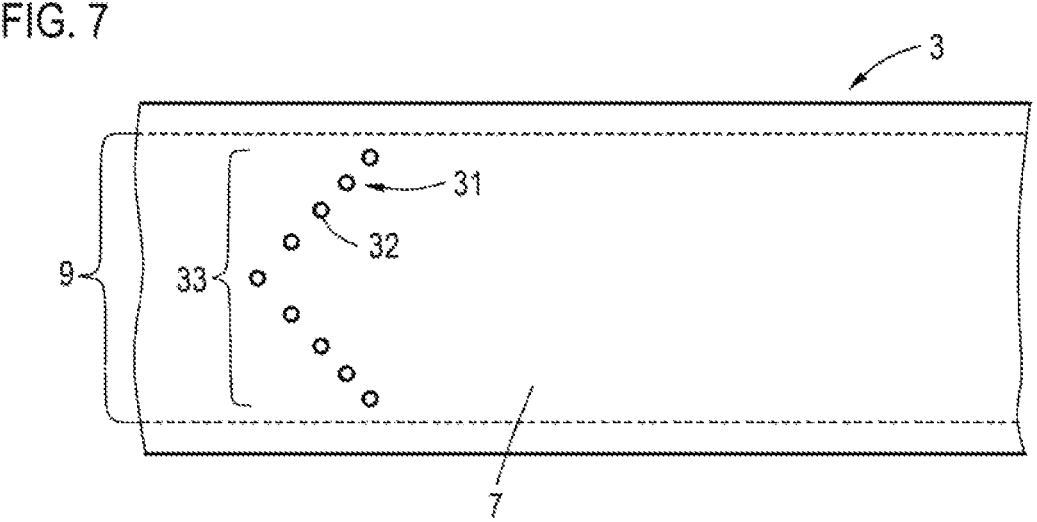

FIG. 7 shows a variant of the exemplary embodiment shown in FIG. 6. In this case, an ultrasound transducer 31 is used whose transducer elements 32 are arranged in a V-shape (a parabolic or concave arrangement is likewise possible). The excitation width 33 in this case again corresponds approximately to the width 9 of the side wall 7. By the V-shaped arrangement, in the case of common driving of the transducer elements 32 with the same excitation signal, in the longitudinal direction 14 of the measuring tube 3 a phase offset is achieved between the various emitted conducted waves, so that these can be superimposed in such a way that an emission angle is adapted.

Figure 8:
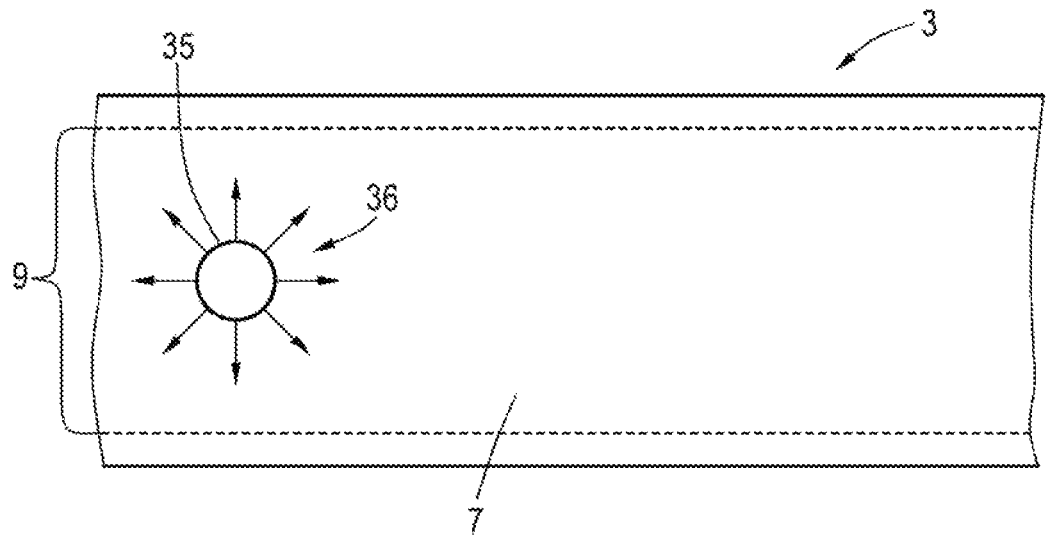

A further exemplary embodiment for an ultrasonic meter is represented in FIG. 8. In this case, an ultrasound transducer 35 is used which comprises a single cylindrical transducer element. Because of the cylindrical shape of the transducer element, emission of the conducted wave in the angle range 36 of 360° takes place. In other words, emission takes place isotropically in all spatial directions. By reflections at the edge of the side wall 7, as has been explained with reference to FIG. 4, in this case as well propagation of the conducted wave essentially over the entire width 9 of the side wall 7 is achieved, so that oscillations are also input into the fluid over the entire width 9. This therefore makes it possible, with little technical outlay, to take into account the flow velocity of the fluid essentially in the entire flow cross section of the measuring tube 3.

Figure 9:
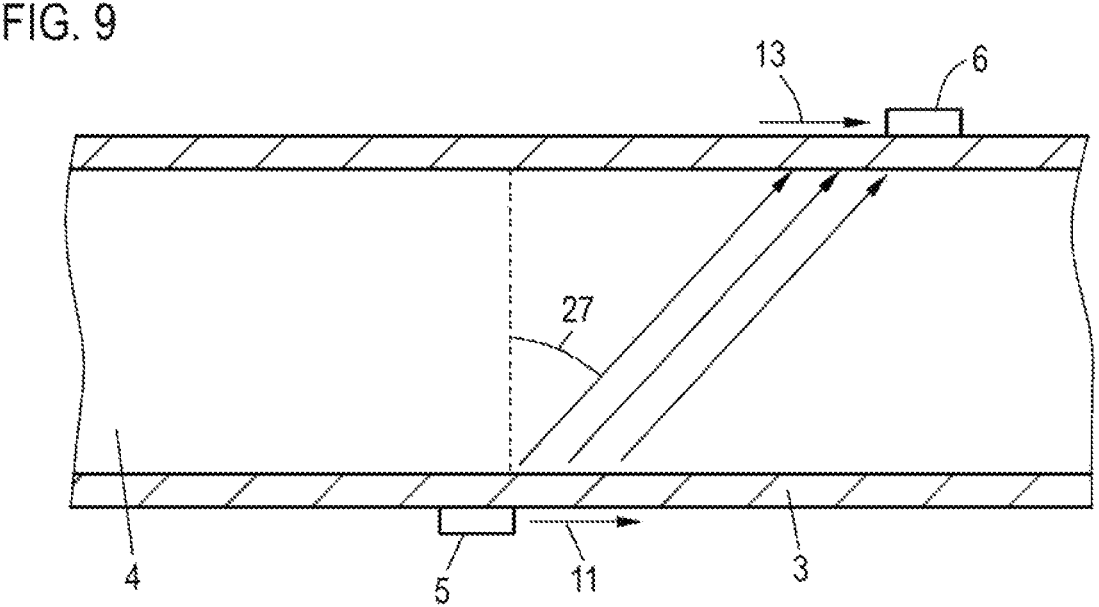
FIG. 9 is a sectional view of a further exemplary embodiment of the ultrasonic meter according to the invention.

The explanations so far assumed that a time of flight is measured after the compression wave conducted through the fluid has been reflected at least once at a side wall. For the measurement principle explained, however, this is not necessary, so that it is also possible to use an arrangement as shown in FIG. 9. The basic structure in this case corresponds to the structure shown in FIG. 1, the first and second ultrasound transducers 5, 6 in this case being arranged on mutually opposite side walls. In one exemplary embodiment which is not shown, it would also be possible to use such an arrangement with the ultrasound waves being reflected several times at the side walls during the propagation through the fluid.

The following is a summary list of reference numerals and the corresponding structure used in the above description of the invention:
1 ultrasonic meter
2 control device
3 measuring tube
4 internal space
5 first ultrasound transducer
6 second ultrasound transducer
7 side wall
8 internal surface
9 width
10 excitation width
11 propagation direction
12 ultrasound beam
13 arrow
14 longitudinal direction
15 thickness
16 ultrasound transducer
17 excitation width
18 propagation direction
19 emission angle
20 ultrasound transducer
21 propagation direction
22 propagation direction
23 emission angle
24 emission angle
25 excitation width
26 excitation width
27 Rayleigh angle
28 ultrasound transducer
29 transducer element
30 excitation width
31 ultrasound transducer
32 transducer element
33 excitation width
34 ultrasound transducer
35 ultrasound transducer
36 angle range

The invention claimed is:

1. An ultrasonic meter for recording a flow quantity dependent on a flow of a fluid, the ultrasonic meter comprising:
a control device;
a measuring tube having a plurality of side walls, mutually adjacent ones of said side walls being at an angle to one another, and through said measuring tube the fluid can flow in a longitudinal direction of said measuring tube; and
ultrasonic transducers, including a first ultrasonic transducer and a second ultrasound transducer, which are disposed at a distance from one another in the longitudinal direction on said measuring tube, said first and said second ultrasound transducers respectively contain one transducer element or a predetermined configuration of a plurality of transducer elements, at least one of said first ultrasound transducer and said second ultrasound transducer is drivable by said control device to excite an acoustic wave conducted in one of said side walls of said measuring tube, the acoustic wave conducted in said side wall propagating along said side wall and emitting a compression wave into the fluid at the so-called Rayleigh angle, the compression wave being conducted through the fluid to a respective other of said ultrasound transducers and can be recorded there by said control device in order to determine a signal time of flight, wherein a propagation direction of the acoustic wave conducted in said side wall which can be excited by at least one of said first ultrasound transducer or said second ultrasound transducer is at an angle to the longitudinal direction of said measuring tube;
wherein one of the following applies:
said transducer element is deformable in order to excite the acoustic wave and has a rectangular contact surface for coupling with said one side wall, two sides of said rectangular contact surface being perpendicular to the propagation direction, and side lengths of said two sides corresponding to an excitation width; or
said transducer elements of at least one of said first ultrasound transducer or of said second ultrasound transducer are disposed linearly with a linear arrangement of said transducer elements arranged at an angle to the transverse direction of said measuring tube to achieve an angled emission with respect to the longitudinal direction of said measuring tube.

2. The ultrasonic meter according to claim 1, wherein said measuring tube has a rectangular tube cross section.

3. The ultrasonic meter according to claim 1, wherein said transducer element or said transducer elements is or are deformable in order to excite the acoustic wave conducted in said side wall, said transducer element or said transducer elements respectively having a round or elliptical contact surface for coupling with said one side wall.

4. The ultrasonic meter according to claim 1, wherein the propagation direction of the acoustic wave conducted in said side wall which can be excited by at least one of said first ultrasound transducer or said second ultrasound transducer is at an angle of between 10° and 80° with respect to the longitudinal direction of said measuring tube.

5. The ultrasonic meter according to claim 1, wherein the excitation width of at least one of said first ultrasound transducer or of said second ultrasound transducer, over which said transducer element or said configuration of said transducer elements extends, is at least 50% or at least 70% of a width of said inner surface of said one side wall on which said respective ultrasound transducer is disposed.

6. The ultrasonic meter according to claim 1, wherein at least one of said first ultrasound transducer or said second ultrasound transducer is drivable by said control device in such a way that two acoustic waves conducted in said side wall with mutually perpendicular propagation directions can be excited simultaneously or with a time offset by said respective ultrasound transducer.

7. The ultrasonic meter according to claim 6, wherein excitation widths are a same for the two acoustic waves conducted in said side wall which can be excited by said respective ultrasound transducer.

8. The ultrasonic meter according to claim 1, wherein said control device and at least one of said first ultrasound transducer or said second ultrasound transducer are adapted to excite a Lamb wave.

9. The ultrasonic meter according to claim 1, wherein at least one of said first ultrasound transducer or said second ultrasound transducer are disposed on an outer side of said measuring tube.

10. The ultrasonic meter according to claim 1, wherein at least one of said first ultrasound transducer or said second ultrasound transducer is drivable by said control device in such a way that the acoustic wave conducted in said side wall with precisely one mode or two acoustic waves conducted in said side wall each with precisely one mode and with mutually perpendicular propagation directions can be excited.

11. The ultrasonic meter according to claim 1, wherein the propagation direction of the acoustic wave conducted in said side wall which can be excited by at least one of said first ultrasound transducer or said second ultrasound transducer is at an angle of between 40° and 50° with respect to the longitudinal direction of said measuring tube.

12. The ultrasonic meter according to claim 5, wherein the excitation width is at least 80% of the width of said inner surface of said one side wall on which said respective ultrasound transducer is disposed.

13. A method for recording a flow quantity dependent on a flow of a fluid, which comprises the steps of:
providing an ultrasonic meter having a control device, a measuring tube being formed by a plurality of side walls, mutually adjacent ones of the side walls being at an angle to one another, and through which the fluid flows in a longitudinal direction of the measuring tube, and a first ultrasound transducer and a second ultrasound transducer which are disposed at a distance from one another in the longitudinal direction on the measuring tube, wherein the first ultrasound transducer and the second ultrasound transducer respectively have one transducer element or a predetermined configuration of a plurality of transducer elements; and
driving at least one of the first ultrasound transducer or the second ultrasound transducer by the control device to excite an acoustic wave conducted in a side wall of the measuring tube, the acoustic wave conducted in the side wall propagating along said side wall and emitting a compression wave into the fluid at the so-called Rayleigh angle, the compression wave being conducted through the fluid to a respective other one of the first and second ultrasound transducers and is recorded there by the control device in order to determine a signal time of flight, wherein the flow quantity is determined as a function of the signal time of flight, wherein acoustic wave conducted in said side wall is excited with a propagation direction which is at an angle to the longitudinal direction of the measuring tube;
wherein one of the following applies:
the transducer element is deformable in order to excite the acoustic wave and has a rectangular contact surface for coupling with the one side wall, two sides of the rectangular contact surface being perpendicular to the propagation direction, and side lengths of the two sides corresponding to the excitation width; or
the transducer elements of at least one of the first ultrasound transducer or of the second ultrasound transducer are disposed linearly with a linear arrangement of the transducer elements arranged at an angle to the transverse direction of the measuring tube to achieve an angled emission with respect to the longitudinal direction of the measuring tube.

* * * * *